Aug. 16, 1932. D. COLE 1,872,412

CHOKE VALVE FOR CARBURETORS

Filed Dec. 15, 1930

INVENTOR.
Don Cole
BY
M. W. M. Conkey
ATTORNEY

Patented Aug. 16, 1932

1,872,412

UNITED STATES PATENT OFFICE

DON COLE, OF EVANSTON, ILLINOIS

CHOKE VALVE FOR CARBURETOR

Application filed December 15, 1930. Serial No. 502,354.

This invention relates to carburetor choke valves, and has for its principal object the provision of an air valve that will automatically open with the air flow through the carburetor.

Another object of the invention is to provide an automatic choke valve that will impose a very slight restriction to the air entering the carburetor while the valve is in its wide-open position.

Another object of the invention is to provide an automatic choke valve in which the component parts do not require extreme accuracy in their manufacture.

An important feature of the invention relates to the arrangement of the spring loaded secondary valve which is mounted on the main valve shaft within an aperture formed in the main valve and comprising two openings located respectively above and below the shaft. The secondary valve is preferably laterally guided by the sides of the aperture and has flat faced projections on opposite sides of the shaft which contact with the face of the main valve to seal the openings. The flat faces overlap the opening and obviate the necessity of accurately forming the openings except at the sides, where care should be used to have the main valve closely fitted about the central bearing portion of the secondary valve.

Other objects and features of the invention will be apparent from the following description of one embodiment thereof which I have illustrated in the accompanying drawing in which.

Figure 1:
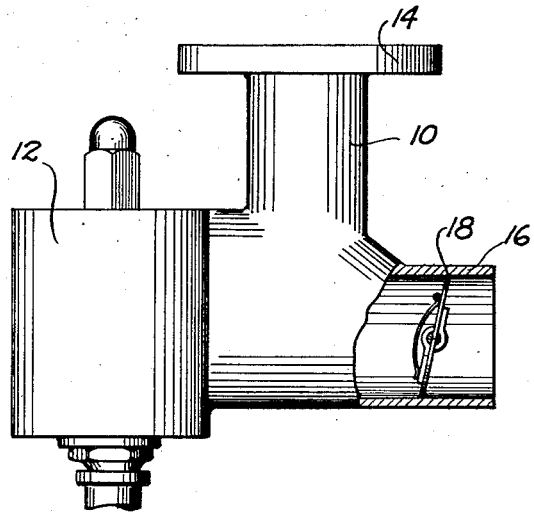
Figure 1 is a side elevation of a carburetor having a portion of the air horn broken away to show the improved choke valve installed therein.

In the drawing 10 is a carburetor having a float chamber 12 and an attaching flange 14 for securing it to an engine manifold (not shown). The main air supply of the carburetor is taken through air horn 16 within which is pivotally mounted a choke valve 18 having an operating shaft 20 which may be rotated by lever 22 for securing the desired adjustment. Valve 18 has an aperture 24 formed in its mid-portion and forming openings above and below the shaft. Within the aperture 24 is a secondary valve 26 rotatable upon the main shaft 20. A spring member 28 is secured to the main valve 18 at one end and has its opposite end tensioned against the lower portion of secondary valve 26 in sliding contact therewith.

Bearing portion 30 of valve 26, is preferably of substantially the same width as the distance between the two parallel sides of the aperture 24 and closely contacts therewith to laterally position the secondary valve on the shaft and to prevent leakage of air between the main and secondary valves adjacent the shaft.
Valve 26 is provided with opposite extensions having flat faces 32 and 34 which contact with opposite sides of the valve 18 and seal the openings above and below the shaft. The flat faced portions of secondary valve 26 are preferably larger than the openings in the main valve whereby the openings are sealed by the contact of the flat faces and no care need be used to accurately form the openings.
The opening above the shaft is constructed of less area than the opening below the shaft in order that pressure will be unbalanced about the axis and cause the secondary valve to assume a position similar to that shown in full lines in Figure 2 when valve 18 is closed and the motor is running.

Figure 2:
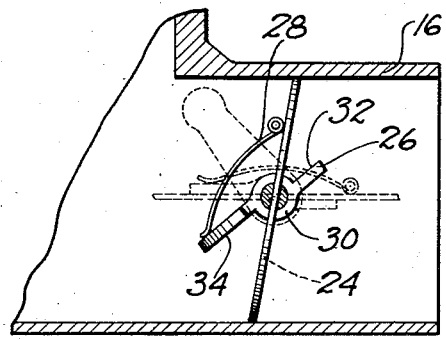
Figure 2 is an enlarged view of a portion of the air horn and choke valve, illustrating two operative positions of the valve.
Figure 3:
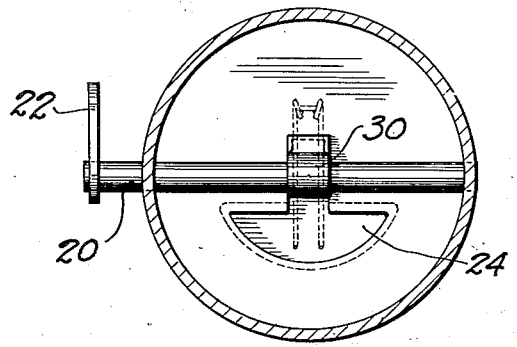
Figure 3 is a view showing the valve as viewed from the entrance to the air horn.

In the operation of the device, the main choke valve 18 is manually closed by moving the lever 22 through any desired connection, to the full closed position shown by full lines in Figure 2. The engine (not shown) is then cranked in the usual manner and upon starting draws air through the horn 16 and opens the spring loaded secondary valve 26 to the desired degree which will be proportionate to the amount of the inflowing air.

After the engine has run for a short time and has been heated sufficiently to no longer require an air restriction, the main choke valve is moved to the full open position shown by dotted lines in Figure 2, in which position the secondary valve no longer presents an unbalanced area to the inflowing air and closely contacts the main valve. In the open position of the main valve 18, there is slight resistance offered to the air flow because both the main and secondary valves present their edge portions to the air stream and are preferably formed of small thickness.

While I have illustrated and described one embodiment of the invention, I do not regard the invention as limited to the form shown or described or otherwise except by the terms of the following claims.

I claim:

1. A carburetor choke comprising a manually operable valve having an opening, a valve operating shaft, and a spring loaded secondary valve rotatable on the shaft for controlling said opening and movable to open position when the manually operable valve is closed.

2. A carburetor choke comprising a manually operable valve, a valve opening shaft, said valve having an opening extending on both sides of the shaft, and a spring loaded secondary valve rotatably mounted on the shaft within said opening for closing the same, the opening on one side of the shaft having a less area than the opening on the other side of the shaft.

3. A carburetor choke comprising a manually operable valve, a valve operating shaft, said valve having an opening extending on both sides of the shaft, and a secondary valve rotatably mounted on the shaft within said opening, a spring coacting between the valves to urge them together, and the opening on one side of the shaft having a less area than the opening on the other side of the shaft.

4. A carburetor choke comprising a manually operable valve having an aperture with parallel sides and comprising two openings, and a secondary valve rotatable within the aperture having a bearing portion contacting the sides of the aperture and in spaced relation to the ends of the openings, said secondary valve having flat faces adapted to contact the main valve and close the end portions of the openings.

5. A carburetor choke comprising a manually operable disc valve having an aperture with parallel sides and comprising two openings, and a spring-loaded secondary valve rotatable within the aperture having a bearing portion contacting the sides of the aperture and in spaced relation to the ends of the openings, said secondary valve having flat faces adapted to contact the disc valve and close the end portions of the openings.

6. A carburetor choke comprising a manually operable valve having an aperture, and a spring loaded secondary valve rotatable on the same axis as the main valve within the aperture, said secondary valve having oppositely extending portions of different area adapted to simultaneously contact with opposite sides of the main valve for closing the aperture.

7. A carburetor choke comprising a manually operable disc valve fixed to a shaft and having an aperture therein constituting two openings disposed on opposite sides of the shaft, and an unbalanced pressure actuated secondary valve rotatable on the shaft and having oppositely extending portions of different area designed to close the openings.

In testimony whereof, I have hereof signed my name.

DON COLE.